United States Patent [19]
Eldin et al.

[11] Patent Number: 6,111,015
[45] Date of Patent: Aug. 29, 2000

[54] CORE/SHELL POLYMER TOUGHENER SUSPENDED IN EPOXY RESIN

[75] Inventors: Sameer H. Eldin, Courtepin; Robert Peter Peyer, Lausen, both of Switzerland; Frans Setiabudi, Bad Krozingen, Germany; Urs Gruber, Arlesheim, Switzerland

[73] Assignee: Ciba Specialty Chemicals Corp., Tarrytown, N.Y.

[21] Appl. No.: 08/391,329

[22] Filed: Feb. 21, 1995

Related U.S. Application Data

[63] Continuation of application No. 08/087,232, Jul. 6, 1993, abandoned.

[30] Foreign Application Priority Data

Jul. 9, 1992 [CH] Switzerland ............................ 2161/92

[51] Int. Cl.$^7$ ............................... C08K 3/34; C08K 7/14; C08L 63/02
[52] U.S. Cl. .............................. 525/65; 523/436
[58] Field of Search ................ 525/65; 523/436

[56] References Cited

U.S. PATENT DOCUMENTS

| | | | |
|---|---|---|---|
| 3,496,250 | 2/1970 | Czerwinski | 525/65 |
| 3,864,426 | 2/1975 | Salensky | 525/65 |
| 4,026,970 | 5/1977 | Backderf et al. | 260/881 |
| 4,082,895 | 4/1978 | Backderf et al. | 525/65 |
| 4,117,038 | 9/1978 | Lehmann et al. | 525/65 |
| 4,537,805 | 8/1985 | Lin | 525/65 |
| 4,645,803 | 2/1987 | Kohli et al. | 525/65 |
| 4,668,736 | 5/1987 | Robins et al. | 525/65 |
| 4,778,851 | 10/1988 | Henton et al. | 525/65 |
| 4,983,672 | 1/1991 | Almer et al. | 525/65 |
| 5,082,732 | 1/1992 | Ueda et al. | 428/402 |
| 5,280,067 | 1/1994 | Tarbutton et al. | 525/65 |

FOREIGN PATENT DOCUMENTS

| | | |
|---|---|---|
| 2039404 | 10/1991 | Canada . |
| 0169066 | 1/1986 | European Pat. Off. . |
| 0336732 | 10/1989 | European Pat. Off. . |
| 0449776 | 10/1991 | European Pat. Off. . |
| 0565206 | 10/1993 | European Pat. Off. . |
| 0576397 | 12/1993 | European Pat. Off. . |
| 2023473 | 5/1970 | Germany . |
| 3920332 | 12/1989 | Germany . |
| 48-32420 | 10/1973 | Japan .............................. 525/65 |
| 1247116 | 9/1971 | United Kingdom . |
| 2238313 | 5/1991 | United Kingdom . |
| 8700188 | 1/1987 | WIPO . |

OTHER PUBLICATIONS

Preliminary Technical Bulletin, Shell Chemical Co., KRA-TON® RP6543 Rubber for toughening epoxy resins, (1989) pp. 3–9.

34$^{th}$ International SAMPE Symposium, (May 1989), KRA-TON® Rubber Modified Epoxy Blends pp. 2243–2254.

Pottick, Shell Chemical Company, Toughening of Epoxy Resins with Styrenic Block Copolymers, (1989) pp. 26–31.

Derwent Abstr. No. 91–290167.

Derwent Abstr. No. 94–001512.

*Primary Examiner*—Robert E. Sellers
*Attorney, Agent, or Firm*—David R. Crichton; Michele A. Kovaleski

[57] ABSTRACT

Curable suspensions of an epoxy resin formulation comprising
- a) a storage-stable suspension of an epoxy resin and a toughener suspended therein which contains no groups that react with a curable epoxy resin system,
- b) dicyandiamide, a polycarboxylic acid, a polycarboxylic anhydride, a polyamine, a polyaminoamide, an amino group-containing adduct of an amine and a polyepoxide, a polyol or a catalytically curing hardener, and, as optional components,
- c) a curing catalyst, conventional fillers or reinforcing materials, are particularly suitable for use as casting resins, laminating resins or adhesives.

7 Claims, No Drawings

CORE/SHELL POLYMER TOUGHENER SUSPENDED IN EPOXY RESIN

This application is a continuation of application Ser. No. 08/087,232, filed Jul. 6, 1993, now abandoned.

The present invention relates to a curable suspension comprising a storage-stable suspension of an epoxy resin and a toughener suspended therein which contains no groups that react with a curable epoxy resin system, an epoxy hardener and, as optional components, a curing catalyst, conventional fillers, reinforcing materials or additives.

It is known to add tougheners, for example core/shell polymers, to curable epoxy resin compositions to improve the toughness properties of the mouldings made from said compositions.

The epoxy resin compositions disclosed in EP-A-0 449 776 comprising a toughener, for example a core/shell polymer, are fully cured with a specific hardener formulation consisting of a carboxylic anhydride and a compound containing two reactive hydrogen atoms.

U.S. Pat. No. 4,778,851 discloses epoxy resins which contain a discontinuous phase of grafted rubber particles which consist of a core that is insoluble in the epoxy resin and having a shell grafted thereon. The shell contains a reactive group, typically a glycidyl group, which reacts concurrently under the cure conditions of the epoxy resin system.

It has now been found that, by suspending in an epoxy resin a toughener which contains no groups that react with a curable epoxy resin system, it is possible to obtain a storage-stable suspension in which the toughener is homogeneously dispersed in the form of very fine particles in the submicron range, and which can be fully cured with a conventional hardener alone so as to obtained cured mouldings, bonds, laminates or coatings with useful mechanical properties.

Accordingly, the invention relates to a curable suspension of an epoxy resin formulation comprising
   a) a storage-stable suspension of an epoxy resin and a toughener suspended therein which contains no groups that react with a curable epoxy resin system,
   b) dicyandiamide, a polycarboxylic acid, a polycarboxylic anhydride, a polyamine, a polyaminoamide, an amino group-containing adduct of an amine and a polyepoxide, a polyol or a catalytically curing hardener, and, as optional components,
   c) a curing catalyst, conventional fillers, reinforcing materials or additives.

The storage-stable suspensions (a) can be prepared by either
   1) when using liquid epoxy resins, adding the aqueous emulsion of a graft or core/shell polymer, with or without a solvent, to the epoxy resin, and removing the water or mixture of water and solvent by vacuum distillation, or
   2) when using solid epoxy resins, fusing the solid epoxy resin or dissolving it in a suitable solvent and adding the aqueous emulsion of a graft or core/shell polymer to the epoxy resin, and subsequently removing the water or mixture of water and solvent by vacuum distillation.

Epoxy resins which may suitably be used for the preparation of the storage-stable suspensions (a) are the standard epoxy resins of epoxy resin technology. Typical examples of epoxy resins are:

I) Polyglycidyl and poly(β-methylglycidyl) esters which are obtainable by reacting a compound containing at least two carboxyl groups in the molecule and epichlorohydrin or β-methylepichlorohydrin. The reaction is conveniently carried out in the presence of a base.

Compounds containing at least two carboxyl groups in the molecule may suitably be aliphatic polycarboxylic acids. Examples of such polycarboxylic acids are oxalic acid, succinic acid, glutaric acid, adipic acid, pimelic acid, suberic acid, azelaic acid or dimerised or trimerised linoleic acid. It is, however, also possible to use cycloaliphatic polycarboxylic acids such as tetrahydrophthalic acid, 4-methyltetrahydrophthalic acid, hexahydrophthalic acid or 4-methylhexahydrophthalic acid. Aromatic polycarboxylic acids can also be used, typically phthalic acid, isophthalic acid and terephthalic acid.

II) Polyglycidyl or poly(β-methylglycidyl) ethers which are obtainable by reacting a compound containing at least two free alcoholic hydroxyl groups and/or phenolic hydroxyl groups and epichlorohydrin or β-methylepichlorohydrin, under alkaline conditions or in the presence of an acid catalyst and subsequent treatment with an alkali.

The glycidyl ethers of this type are typically derived from acyclic alcohols, typically from ethylene glycol, diethylene glycol and higher poly(oxyethylene) glycols, 1,2-propanediol or poly(oxypropylene) glycols, 1,3-propanediol, 1,4-butanediol, poly(oxytetramethylene) glycols, 1,5-pentanediol, 1,6-hexanediol, 2,4,6-hexanetriol, glycerol, 1,1,1-trimethylolpropane, pentaerythritol, sorbitol, as well as from polyepichlorohydrins. They may also be derived from cycloaliphatic alcohols such as 1,4-cyclohexanedimethanol, bis(4-hydroxycyclohexyl)methane or 2,2-bis(4-hydroxycyclohexyl)propane, or they contain aromatic nuclei such as N,N-bis(2-hydroxyethyl)aniline or p,p'-bis(2-hydroxyethylamino)diphenylmethane.

The glycidyl ethers may also be derived from mononuclear phenols, typically from resorcinol or hydroquinone, or they are derived from polynuclear phenols such as bis(4-hydroxyphenyl)methane, 4,4'-dihydroxybiphenyl, bis(4-hydroxyphenyl)sulfone, 1,1,2,2-tetrakis(4-hydroxyphenyl)ethane, 2,2-bis(4-hydroxyphenyl)propane, 2,2-bis(3,5-dibromo-4-hydroxyphenyl)propane, as well as from novolaks obtainable by condensation of aldehydes such as formaldehyde, acetaldehyde, chloral or furfuraldehyde, with phenols such as phenol, or with phenols which are substituted in the nucleus by chlorine atoms or $C_1$–$C_9$alkyl groups, for example 4-chlorophenol, 2-methylphenol or 4-tert-butylphenol, or by condensation with bisphenols of the type cited above.

III) Poly-(N-glycidyl) compounds obtainable by dehydrochlorination of the reaction products of epichlorohydrin with amines which contain at least two amino hydrogen atoms. These amines are typically aniline, n-butylamine, bis(4-aminophenyl)methane, m-xylylenediamine or bis(4-methylaminophenyl)methane.

The poly(N-glycidyl) compounds also include triglycidyl isocyanurate, N,N'-diglycidyl derivatives of cycloalkylene ureas such as ethylene urea or 1,3-propyleneurea, and diglycidyl derivatives of hydantoins, typically of 5,5-dimethylhydantoin.

IV) Poly(S-glycidyl) compounds, preferably bis(S-glycidyl) derivatives which are derived from dithiols such as 1,2-ethanediol or bis(4-mercaptomethylphenyl) ether.

V) Cycloaliphatic epoxy resins, including bis(2,3-epoxycyclopentyl) ether, 2,3-epoxycyclopentyl glycidyl ether, 1,2-bis(2,3-epoxycyclopentyloxy)ethane or 3,4-epoxycyclohexylmethyl-3',4'-epoxycyclohexane-carboxylate.

It is also possible to use epoxy resins in which the 1,2-epoxy groups are attached to different hetero atoms or functional groups. These compounds typically comprise the N,N,O-triglycidyl derivative of 4-aminophenol, the glycidyl ether-glycidyl ester of salicylic acid, N-glycidyl-N'-(2-glycidyloxypropyl)-5,5-dimethylhydantoin or 2-glycidyloxy-1,3-bis(5,5-dimethyl-1-glycidylhydantoin-3-yl)propane.

For the preparation of the storage-stable suspensions it is preferred to use a liquid or solid polyglycidyl ether or ester, most preferably a liquid or solid diglycidyl ether of a bisphenol or a liquid or solid diglycidyl ester of a cycloaliphatic or aromatic dicarboxylic acid, or a cycloaliphatic epoxy resin. Mixtures of epoxy resins can also be used.

Solid polyglycidyl ethers or esters are suitably compounds having melting points above room temperature up to c. 250° C. The melting points of the solid compounds preferably are in the range from 50 to 150° C. Such solid compounds are known and some are commercially available. The advancement products obtained by advancement of liquid polyglycidyl ethers and esters may also be used as solid polyglycidyl ethers and esters.

Tougheners suitable for use in the storage-stable suspensions (a) are typically the elastomers or elastomer-containing graft polymers known to those skilled in the art as rubber tougheners. The tougheners may also be solid or liquid in the initial state. They may not contain any reactive groups that could react with the epoxy resin in the suspension. It is preferred to use solid tougheners. Solid tougheners typically comprise the graft polymers disclosed, inter alia, in U.S. Pat. Nos. 3,496,250 and in 4,366,289, as well as the core/shell polymers disclosed in EP-A-0-045 357 and in U.S. Pat. No. 4,419,496.

In particular, the novel suspensions contain a solid toughener. Solid tougheners have the advantage that the particle size and the amount of toughener phase in the suspension are predetermined. When using liquid tougheners, the requisite second phase does not form until during the cure with the epoxy resin.

Graft polymers are typically methacrylate/butadiene-styrene polymers, acrylate-methacrylatelbutadiene-styrene polymers or acrylonitrile/butadiene-styrene polymers.

Core/shell polymers normally have a soft core of an elastomeric material which is insoluble in the epoxy resin matrix. Grafted thereon is a shell of polymeric material which contains no reactive groups. The core/shell polymer may also be a so-called multi-core/shell polymer, conveniently one having the structure soft core, hard shell, soft shell and hard shell. Such polymers are disclosed, inter alia, in GB-A-2 039 496.

In a particularly preferred embodiment of the invention, the storage-stable suspensions contain a core/shell polymer.

Examples of elastomers which may be used as core material are polybutadiene, polyacrylates and polymethacrylates and their co- or terpolymers with polystyrene, polyacrylonitrile or polysulfide.

The core material preferably contains polybutadiene or polybutylacrylate.

Typical examples of polymeric shell materials are polystyrene, polyacrylonitrile, polyacrylate and polymethacrylate mono-, co- or terpolymers or styrene/acrylonitrile/glycidyl methacrylate terpolymers.

It is preferred to use polymethyl methacrylate as shell material.

The size of such core/shell particles is conveniently 0.05 to 30 $\mu$m, preferably 0.05 to 15 $\mu$m. It is preferred to use core/shell particles having a size smaller than 1 $\mu$m.

The core/shell polymers can be prepared by the method described in U.S. Pat. No. 4,419,496 or EP-A-0 045 357.

It is preferred to use core/shell polymers which contain a core of polybutadiene or polybutadiene/polystyrene. This core material is preferably partially crosslinked. Further core materials are polyacrylates and polymethacrylates, preferably polymethyl acrylates and polymethyl methacrylates and their co- and terpolymers.

The shell consists preferably of polymers based on methyl methacrylate, cyclohexyl methacrylate, butyl acrylate, styrene or methacrylonitrile.

The amount of toughener in the novel suspensions containing an epoxy resin is preferably up to to 80% by weight, most preferably up to 50% by weight, based on the epoxy resin.

The storage-stable suspensions comprising an epoxy hardener and a toughener suspended therein are suitable in simple and practical manner for the preparation of curable epoxy resin formulations in which the toughener is homogeneously dispersed, which formulations may also be in the form of suspensions. From the processing aspect, the novel suspensions may be regarded as a simple means of preparing curable epoxy resin formulations in which a toughener present therein is homogeneously dispersed. In addition, the preparation of such epoxy resin formulations makes it possible to achieve a certain consistency of quality in advantageous manner.

Suitable polycarboxylic acids for curing the above suspensions are typically aliphatic polycarboxylic acids such as maleic acid, oxalic acid, succinic acid, nonyl- or dodecyl-succinic acid, glutaric acid, adipic acid, pimelic acid, suberic acid, azelaic acid or dimerised or trimerised linoleic acid, cycloaliphatic polycarboxylic acids such as tetrahydrophthalic acid, methylendomethylenetetrahydrophthalic acid, hexachloroendomethylenetetrahydrophthalic acid, 4-methyltetrahydrophthalic acid, hexahydrophthalic acid, or 4-methylhexahydrophthalic acid, or aromatic polycarboxylic acids such as phthalic acid, isophthalic acid, terephthalic acid, trimellitic acid, pyromellitic acid or benzophenone-3, 3',4,4'-tetracarboxylic acid, as well as the anhydrides of these polycarboxylic acids.

Polyamines suitable for curing the novel suspensions are aliphatic, cycloaliphatic, aromatic or heterocyclic amines, including ethylenediamine, 1,2-propanediamine, 1,3-propanediamine, N,N-diethylethylenediamine, hexamethylenediamine, diethylenetriamine, triethylentetramine, tetraethylenepentamine, N-(2-hydroxyethyl)-, N-(2-hydroxypropyl) and N-(2-cyanoethyl) diethyltriamine, 2,2,4-trimethyl-1,6-hexanediamine, 2,3,3,-trimethyl-1,6-hexanediamine, N,N-dimethyl- and N,N-diethyl-1,3-propanediamine, ethanolamine, m- and p-phenylenediamine, bis(4-aminophenyl)methane, aniline-formaldehyde resins, bis(4-aminophenyl)sulfone, m-xylylenediamine, bis(4-aminocyclohexyl)methane, 2,2-bis(4-aminocyclohexyl)propane, 2,2-bis(4-amino-3-methylcyclohexyl)propane, 3-aminomethyl-3,5,5-trimethylcyclohexylamine (isophoronediamine) and N-(2-aminoethyl)piperazine, and, as polyaminoamides, typically those from aliphatic polyamines and dimerised or trimerised fatty acids.

Polyaminoamides suitable for curing the novel suspensions are typically the reaction products obtained by reaction of polycarboxylic acids, preferably of dimerised fatty acids, with polyamines in molar excess and described, iner alia, in the Handbook of Epoxy Resins, 1967, pages 10-2 to 10—10, by H. Lee and K. Neville.

Amino group-containing adducts of an amine and a polyepoxide as hardener for epoxy resins are also known and can be used for curing the novel suspensions. They may be obtained by reacting epoxy resins with polyamines in equivalent excess. Such amino group-containing adducts are described in more detail, inter alia, in U.S. Pat. Nos. 3,538,184; 4,330,659; 4,500,582 and 4,540,750.

Aliphatic polyols suitable as curing agents for use in the novel suspensions are typically ethylene glycol, diethylene glycol and higher poly(oxyethylene) glycols, 1,2-propanediol or poly(oxypropylene) glycols, 1,3-propanediol, 1,4-butanediol, poly(oxytetramethylene) glycols, 1,5-pentanediol, 1,6-hexanediol, 2,4,6-hexanetriol, glycerol, 1,1,1-trimethylolpropane, pentaerythritol or sorbitol.

Aromatic polyols suitable as curing agents for use in the novel suspensions include mononuclear phenols such as resorcinol, hydroquinone, N,N-bis(2-hydroxyethyl)aniline, or polynuclear phenols, such as p,p'-bis(2-hydroxyethylamino)diphenylmethane, bis(4-hydroxyphenyl)methane, 4,4'-dihydroxybiphenyl, bis(4-hydroxyphenyl)sulfone, 1,1,2,2-tetrakis(4-hydroxyphenyl) ethane, 2,2-bis(4-hydroxyphenyl)propane, 2,2-bis(3,5-dibromo-4-hydroxyphenyl)propane, as well as novolaks obtainable by condensation of aldehydes, typically formaldehyde, acetaldehyde, chloral or furfuraldehyde, with phenols such as phenol, or with phenols which are substituted in the nucleus by chlorine atoms or $C_1$–$C_9$alkyl groups, for example 4-chlorophenol, 2-methylphenol, or 4-tert-butylphenol, or by condensation with bisphenols, such as those of the indicated type.

Catalytic hardeners can also be used for preparing the novel suspensions, typically tertiary amines such as 2,4,6-tris(dimethylaminoethyl)phenol and other Mannich bases, N-benzyldimethylamine and triethanolamine; alkali metal alkoxides of alcohols, typically the sodium alcoholate of 2,4-dihydroxy-3-hydroxymethylpentane; tin salts of alkanoic acids, typically tin octanoate; Friedel-Crafts catalysts such as boron trifluoride and the complexes and chelates thereof which are obtained by reacting boron trifluoride with e.g. 1,3-diketones.

The preferred hardener for the storage-stable suspensions (a) is a polycarboxylic acid or anhydride thereof, a polyamine, dicyandiamide or a catalytic hardener.

Suitable accelerators can also be used for curing with the epoxy hardeners. Typical examples of such accelerators when using dicyandiamide, polyaminoamides, polycarboxylic acids and their anhydrides, are tertiary amines or the salts thereof, quaternary ammonium compounds or alkali metal alkoxides.

The amount of hardener depends on the chemical nature of the hardener and on the desired properties of the curable mixture and the cured product. The maximum amount can be easily determined. If the hardener is an amine, then normally 0.75 to 1.25 equivalents of amino hydrogen are used per 1 epoxide equivalent. If a polycarboxylic acid or anhydride thereof is used, then usually 0.4 to 1.1 equivalents of carboxyl group or anhydride group per 1 epoxide equivalent are used. When using a polyphenol as hardener, 0.75 to 1.25 phenolic hydroxyl groups per 1 epoxide equivalent are used. Catalytic hardeners are usually used in amounts of 1 to 40 parts by weight per 100 parts by weight of epoxy resin.

The novel suspensions may also contain the standard fillers and reinforcing materials of epoxy resin technology. Illustrative examples of suitable fillers are: mineral and fibrous fillers such as quartz powder, fused silica, alumina, glass powder, mica, kaolin, dolomite, graphite, carbon black as well as carbon fibres and textile fibres. Preferred fillers are quartz powder, fused silica, alumina or dolomite. Illustrative examples of suitable reinforcing materials are glass fibres or carbon fibres.

The novel suspensions are prepared by per se known methods using known mixer aggregates such as stirrers, kneaders, roll mills or, in the case of solid substances, in dry mixers.

The novel suspensions are cured to mouldings or the like in the standard known manner of epoxy resin technology, for example as described in the "Handbook of Epoxy Resins", 1967, by H. Lee and K. Neville.

The novel suspensions are admirably suitable for use as casting resins, laminating resins, adhesive compositions, moulding materials, coating materials and as coating systems for electrical and electronic components. The preferred utilities are casting resins, laminating resins or adhesives.

Example A

Preparation of a diglycidyl ether-core/shell polymer suspension a) Preparation of a core/shell polymer:

202.7 g of polybutadiene latex (BL 2004 K, sold by Bayer AG), having a solids content of 59.2%, and 397.3 g of deionised water are placed, under nitrogen, in a 1 liter ground glass flask equipped with double jacket, glass anchor stirrer, thermometer, condenser, rotary thermostat and gas inlet, and stirred at 100 rpm. The mixture is heated to 80° C.±1° C. After about 55 minutes (min), the internal temperature is 80° C. Then the dropwise addition of 120.0 g of distilled methyl methacrylate (purum, sold by Fluka, Switzerland) and of a solution of 4.0 g of potassium peroxide disulfate and 3.5 g of sodium dodecylbenzenesulfonate in 110 ml of distilled water is commenced. After 3.5 hours (h), a homogeneous white emulsion is obtained. After altogether 6 h and 10 min, the addition of methyl methacrylate and of the initiator is complete. Stirring is continued for a further 2 h at 80° C. At the end of this time, 3 ml of a 20% emulsion of n-octadecyl 3-(3,5-di-tert-butyl-4-hydroxyphenyl)propionate are added to the homogeneous white emulsion, and the entire batch is then cooled to room temperature (RT). The emulsion is likewise homogeneous and white at RT. It is filtered through glass wool. No agglomerates are present. The emulsion is diluted to 815 g, corresponding to a solids content of 27.2%. The emulsion so obtained is used as toughener.

b) A 2 liter ground glass flask equipped with glass anchor stirrer, thermometer, condenser, distillation tube with receiver and vacuum connection is charged with 600 g of liquid diglycidyl ether of bisphenol A having an epoxy value of 5.42 equivalents/kg, and 220.6 g of the aqueous emulsion of the core/shell polymer prepared according to Example A(a) are added and the batch is stirred for 15 min. The homogeneous mixture is then heated to c. 80° C. and evacuated to 150–200 mbar such that water distills from the mixture. Towards the end of distillation the pressure is lowered to 40–50 mbar, and residual water is removed over c. 30 min. The resultant homogeneous white suspension is readily stirrable at 80° C. and is drawn off after cooling to 50° C.

| Yield: | 656 g |
|---|---|
| epoxy value: | 4.93 equivalents/kg |
| content of toughener: | 10 phr*, based on the epocy resin |

*phr = parts per hundred (parts by weight per 100 parts by weight of epoxy resin).

Example B

Preparation of a diglycidyl ether-core/shell polymer suspension a) Preparation of a core/shell polymer:

The emulsion of Example Aa) with a solids content of 27.1% is used.

b) Example Ab) is repeated, but using as epoxy resin 650 g of a mixture of 15 g of a diglcidyl ether of 1,4-butanediol and 85 g of a liquid diglcidyl ether of bisphenol A having an epoxy value of 5.91 equivalents/kg. 359.8 g of polybutadiene latex are also used. A readily stirrable suspension is obtained.

| | |
|---|---|
| epoxy value: | 5.14 equivalents/kg |
| content of toughener: | 15 phr. |
| viscosity (Epprecht) at 40° C. | 2100 mPa.s. |

Example C

Preparation of a diglycidyl ester-core/shell polymer suspension a) Example Aa) is repeated to give an emulsion with a solids content of 27.2%.

b) Example Ab) is repeated, but using as epoxy resin 600 g of a diglycidyl ester of 1,2-dicarboxylic acid having an epoxy value of 5.6–6.2 equivalents/kg. A readily stirrable suspension is obtained.

| | |
|---|---|
| epoxy value: | 5.32 equivalents/kg |
| content of toughener: | 10 phr. |

Example D

Preparation of a diglyicdyl ether-core/shell polymer suspension a) Example Aa) is repeated and en emulsion with a solids content of 28.15% is obtained.

b) 1050.0 g of a solid diglycidyl ether of bisphenol A modified with 0.84% by weight of nonylphenol hydroxyethyl ether and having an epoxy value of 2.55–2.7 equivalents/kg and a melting range of 35–50° C. is heated to c. 130° C., without stirring, in a 3 liter ground glass flask, equipped as described in Example A. Then the emulsion obtained according to Example Da) is added at this temperature and stirred for 15 minutes. The mixture is evacuated to 650–700 mbar and the bulk of the water is distilled off under this vacuum over about 2 h through the distillation tube and collected in the receiver. Further evacuation is effected cautiously, and the reaction mass becomes temporarily highly viscous. At the conclusion, the reaction mass is stirred for 30 min at 130° C./20–30 mbar and then for 15 min under high vacuum (0.1–0.2 mbar). The resultant white, turbid viscous product is poured on to coated paper at c. 120° C. After cooling, the solidified product is mechanically comminuted.

| | |
|---|---|
| epoxy value: | 2.40 equivalents/kg |
| content of toughener: | 10 phr. |

Example E

Preparation of a diglyicdyl ether-core/shell suspension a) Preparation of a core/shell polymer An apparatus consisting of a 1 liter ground glass flask, glass anchor stirrer, thermometer, condenser, dropping funnel and rotating thermostat is flushed with nitrogen and then charged with 600 g of water, 18 g of a mixture of 121.4 g of butyl acrylate, 28.6 g of styrene and 3.2 g of allyl methacrylate (monomer mixture I) and 1.2 g of sodium dioctylsulfosuccinate (Hydropalat® 875 sold by Henkel). The slightly turbid emulsion is heated, with stirring, at an external temperature (TA) of 90° C. over about 20 min to 65–70° C. After 20 min, 10 ml of an aqueous 1% solution of potassium persulfate are added at an internal temperature (TI) of 65–70° C. After a further 20 min, another 10 ml of aqueous 1% solution of potassium persulfate are added, followed by the addition over 45 min of 136.2 g of the monomer mixture I. When the addition is complete, the reaction emulsion is stirred for another 30 min. Then 25 ml of the aqueous 1% solution of potassium persulfate and afterwards 76.6 g of methyl methacrylate and 1.2 g of sodium dioctylsulfosuccinate are added dropwise over 1 h. Then a further 25 ml of potassium persulfate solution are added dropwise and the emulsion is stirred for 1 h, during which time another 12 ml of potassium persulfate solution are added after 30 min. After cooling to RT, the milky-white emulsion is filtered through glass wool. Yield: 1065 g of latex with a solids content of 21.5%.

b) An apparatus consisting of a 2 liter ground glass flask equipped with glass anchor stirrer, thermometer, Vigreux column, condenser, distillation tube with receiver, heating bath and vacuum connection for a water jet pump is charged with 600.0 g of a diglycidyl ether of bisphenol A with an epoxy value of 5.40 equivalents/kg and 2791 g of the latex described in a), and stirred for 5 min. The contents of the flask are heated to a TI of 70–80° C., and the apparatus is cautiously evacuated. At 200 mbar the water begins to distill and the vacuum is increased stepwise. After about 2 h all the water has distilled off and the final vacuum of 20–30 mbar is reached. The homogeneous white turbid suspension is stirred after 30 min at TI 70–80° C. and 20–30 mbar and afterwards drawn off hot.

| | |
|---|---|
| Yield: | 659.4 g of suspension (99.5% of theory) |
| epoxy value: | 4.91 equivalents/kg |
| content of toughener: | 10 phr |
| viscosity (Epprecht) at 40° C.: | 3 440 mPa.s. |

Example F

Preparation of a diglycidyl ester core/shell polymer suspension a) Preparation of a core/shell polymer:

Example Ea) is repeated to give a latex having a solids content of 23.0%.

b) Example Eb) is repeated, using as epoxy resin a diglycidyl ester of 1,2-dicarboxylic acid having an epoxy value of 5.89 equivalents/kg, and 421.7 g of the latex of Example Fa). The low viscosity suspension obtained has the following properties:

| | |
|---|---|
| viscosity (Epprecht) at 40° C.: | 510 mPa.s |
| epoxy content | 5.35 equivalents/kg |
| content of toughener: | 10 phr. |

Example G

Preparation of a suspension of a solid diglycidyl ether epoxy resin a) Preparation of a core/shell polymer:

Example Aa) is repeated to give a latex (emulsion) with a solids content of 23.8%.

b) The apparatus used in Example Eb) is charged with 600.0 g of a solid diglycidyl ether of bisphenol A modified with 0.84% by weight of nonylphenol hydroxyethyl ether and having an epoxy value of 2.64 equivalents/kg, and 400 ml of methyl ethyl ketone. The mixture is heated to a TI of 80–90° C. and then stirred slowly until a complete solution is obtained. Then 252.1 g of the latex of Example Ga) are added and the mixture is stirred for 5 min. The apparatus is then cautiously evacuated. A mixture of water/methyl ethyl ketone begins to distill at c. 600 mbar. The temperature is raised stepwise to 140–150° C., and the vacuum is increased initially to 20–30 mbar and then stepwise further. After about 2 h all the water/methyl ethyl ketone has distilled off. Stirring is continued for 15 min at the final vacuum and a TI of 140–150° C. The homogeneous, white turbid suspension is poured into steel dishes to a layer thickness of 2–3 cm.

Yield: 658.6 g (99.8% of theory). The product has the following properties:

| | |
|---|---|
| viscosity (Epprecht) at 120° C.: | 1340 mPa.s |
| epoxy value: | 2.4 equivalents/kg |
| content of toughener: | 10 phr. |

Example H

Preparation of a suspension of a solid diglycidyl ether epoxy resin a) Preparation of a core/shell polymer:

Example Ea) is repeated to give a latex with a solids content of 23.4%:

b) Example Gb) is repeated, using 161.3 g of the latex of Example Ha). The homogeneous suspension obtained is solid at room temperature and has the following properties:

| | |
|---|---|
| viscosity (Epprecht) at 120° C.: | 1280 mPa.s |
| epoxy value: | 2.40 equivalents/kg |
| content of toughener: | 10 phr. |

Example I

Preparation of a suspension of a diglycidyl ether of bisphenol F a) Preparation of a core/shell polymer:

Example Aa) is repeated to give an emulsion with an epoxy value of 28.25%.

b) Example Ab) is repeated, using 354.0 g of the emulsion of Example Ia) and 1000 g of diglycidyl ether of bisphenol F (mixture of isomers) with an epoxy value of 6.20 equivalents/kg. The homogeneous low viscosity suspension obtained has the following properties:

| | |
|---|---|
| viscosity (Epprecht) at 25° C.: | 1060 mPa.s |
| epoxy value: | 5.64 equivalents/kg |
| content of toughener: | 10 phr. |

Example J

Preparation of a suspension of a cycloaliphatic epoxy resin a) Preparation of a core/shell polymer:

In accordance with the general procedure of Example Aa), 120 g of methyl methacrylate are grafted on to 300 g of a polybutadiene/styrene latex (Intex® 084) with a styrene content of 24% and a solids content of 40.0%.

| | |
|---|---|
| Yield: | 937.3 g |
| solids content: | 25.7% |
| Shore D hardness: | 62. | b) 214.0 g of the latex obtained in Ja) are processed in accordance with the general procedure of Example Eb) with 550 g of 3,4-epoxycyclohexylmethyl-3,4-epoxycyclohexylcarboxylate, which has an epoxy value of 7.18 equivalents/kg, to a suspension.

| | |
|---|---|
| Yield: | 604.7 g |
| viscosity (Höppler) 25° C.: | 2870 mPa.s |
| epoxy value: | 6.53 equivalents/kg |
| content of toughener: | 10 phr. |

Example K

Preparation of a diglycidyl ether core/shell polymer suspension a) Preparation of a core/shell polymer:

Following the general procedure of Example Ja), a core/shell polymer is prepared with a polybutadiene/styrene core (Intex® 084 having a styrene content of 24% and a solids content of 40%) and a methyl methacrylate as shell. The polymer latex so obtained has a solids content of 24.3%.

b) Example Ab) is repeated, using as epoxy resin 600 g of a mixture of 15 g of a diglycidyl ether of 1,4-butanediol and 85 g of a liquid diglycidyl ether of bisphenol A which has an epoxy value of 5.94 equivalents/kg. 370.4 g of the core/shell polymer latex described in Example Ka) are also used. A readily stirrable suspension is obtained.

| | |
|---|---|
| viscosity (Epprecht) bei 40° C.: | 2420 mPa.s |
| epoxy value: | 5.16 equivalents/kg |
| content of toughener: | 15 phr. |

Example L

Preparation of a diglycidyl ether core/shell polymer suspension a) Preparation of a core/shell polymer:

A core/shell polymer is prepared in accordance with the procedure of Example Aa). The polymer latex has a solids content of 27.1%.

b) Example Ab) is repeated, using as epoxy resin 500 g of a liquid diglycidyl ether of bisphenol A which has an epoxy value of 5.38 equivalents/kg. 184.5 g of the core/shell polymer latex described in Example La) are also used. The suspension has the following properties:

| | |
|---|---|
| viscosity (Epprecht) at 40° C.: | 3 280 mPa.s |
| epoxy value: | 4.89 equivalents/kg |
| content of toughener: | 10 phr. |

EXAMPLE 1

100 g of the diglycidyl ether-core/shell polymer suspension prepared in Example A and 90 g of methyltetrahydrophthalic acid having a viscosity of 50–100 mPa.s at 25° C. are heated to c. 60–70° C., and then 1 g of 1-methylimidazole is added to the reaction mixture and the batch is well stirred. To remove entrapped air bubbles, the casting resin formulation is evacuated for 5 min under a high vacuum and then poured into moulds. The cure is carried out for 2 h at 100° C. and then for 8 h at 180° C. The mouldings have a fracture toughness (bend notch method according to CG Standard PM 258-0/90) of 369.9 J/m$^2$.

EXAMPLE 2

In accordance with Example 1, 115 g of the diglycidyl ether-core/shell polymer suspension prepared in Example B and 35 g of 3,3'-dimethyl-4,4'-diaminodicyclohexylmethane are stirred to a casting resin formulation which is evacuated for 8 min and then cast to mouldings. The cure is carried out for 1 h at 100° C. and then for 8 h at 140° C. The mouldings have a fracture toughness (bend notch method) of 522.0 J/m$^2$.

EXAMPLE 3

In accordance with Example 1, 115 g of the diglycidyl ether-core/shell polymer suspension prepared in Example B, 35 g of 3,3'-dimethyl-4,4'-diaminodicyclohexylmethane and 5 g of benzylamine are stirred to a casting resin formulation which is evacuated for 8 min and then cast to mouldings. The cure is carried out for 1 h at 100° C. and then for 8 h at 140° C. The mouldings have a fracture toughness (bend notch method) of 1229.7 J/m$^2$.

EXAMPLE 4

110 g of the diglycidyl ether-core/shell polymer suspension prepared in Example D are preheated in an oven at 120–140° C. Then 35 g of a mixture of 35 g of 1,3-isobenzofurandione and 65 g of 1,2,5,6-tetrahydrophthalic anhydride are fused and 217.5 g and the melt is added to 217.5 g of quartz powder (Quarzmehl K8, supplied by Edouard Kick, Germany) which is preheated to 160° C. The mixture is blended, evacuated at c. 5 mbar and then cast to mouldings. The cure is carried out for 16 h at 140° C. The mouldings have a fracture toughness (double torsion test according to CG Standard PM 216-0/89) of 961.0 J/m$^2$.

EXAMPLE 5

115 g of the diglycidyl ether-core/shell polymer suspension prepared in Example L, 7.57 g of dicyandiamide and 2.27 g of chlortoluron [3-(3-chloro-4-methylphenyl)-1,1-dimethylurea] are processed twice on a 3-roll mill, then 1.0 g of Aerosil® (SiO$_2$) are added and, after mixing, the whole mixture is processed again on the 3-roll mill. The absolutely homogeneous suspension is finally degassed for 45 min under a vacuum of 0.1 mbar. The finished formulation has a viscosity (Epprecht) of 12 800 mpa.s. Polished aluminium strips, oily steel strips as well as polished steel strips are bonded with the formulation and fully cured for 30 min at 160° C. Furthermore, a formulation additionally containing 1% by weight of ballotinis (diameter 50 μm) for bonding oily steel strips is used under the same conditions. The bonds have the following properties:

| | |
|---|---|
| tensile shear strength (ISO 4587) polished aluminum strips: | 34.7 N/mm$^2$ |
| oily steel strips | 21.8 N/mm$^2$ |
| oily steel strips with ballotinis | 24.9 N/mm$^2$ |
| peel strength (ISO 4578) polished steel strips | 5.0 N/mm$^2$. |

EXAMPLE 6

110 g of the diglycidyl ether-core/shell polymer suspension prepared in Example E and 90 g of methyltetrahydrophthalic anhydride are heated to c. 60–70° C., and then 1 g of 1-methylimidazole is added to the reaction mixture. The whole mixture is well stirred and then, before being cast to standard boards, evacuated for 5 min under a high vacuum. The cure is carried out for 2 h at 100° C. and for 8 h at 140° C. The mouldings obtained have the following properties:

| | |
|---|---|
| glass transition temperature (TMA): | 149° C. |
| flexural strength (ISO 178): | 127.4 N/mm$^2$ |
| impact resistance (ISO 179): | 31 kJ/m$^2$ |
| fracture toughness (bend notch method): | 394 J/m$^2$. |

EXAMPLE 7

Example 6 is repeated, except that 300 g of quartz powder (Quartz powder W12) are added to the formulation. Mouldings having the following properties are obtained under the same cure conditions:

| | |
|---|---|
| glass transition temperature (TMA): | 146° C. |
| flexural strength (ISO 178): | 109.9 N/mm$^2$ |
| impact resistance (ISO 179): | 7.3 kJ/m$^2$ |
| fracture toughness (double torsion test): | 438 J/m$^2$. |

EXAMPLE 8

53 g of the diglycidyl ether-core/shell polymer suspension prepared in Example I, 30 g of a glycidyl ether of a phenol novolak having an epoxy value of 5.6–5.8 equivalents/kg, 12.2 g of a diglycidyl ether of bisphenol A having an epoxy value of 5.1–5.8 equivalents/kg, 4.8 g of dicyandiamide, 0.65 g of 2-ethyl-4-methylimidazole and 0.65 g of benzyl alcohol are well mixed. The formulation has a viscosity (Epprecht) of 330 mpa.s at 60° C. and the gel time (plate) at 120° C. is 12.7 min. After curing for 30 min at 120° C. and for 1 h at 150° C., mouldings with the following properties are obtained:

| | |
|---|---|
| glass transition temperature (DSC): | 136° C. |
| flexural strength (ISO 178): | 125 N/mm² |
| fracture toughness (bend notch method): | 306 J/m². |

Pipes having an internal diameter of 40 mm with only the circumferential wind used for measuring the transverse tensile strength are fabricated on a filament winding apparatus supplied by Bolenz & Schafer. The technical data are:

| | |
|---|---|
| impregnating bath temperature: | 50° C. |
| mandrel, heated internally to: | 60–65° C. |
| filament take-off tension: | 4 kp |
| gelation, rotating on mandrel: | 30 min at 120° C. |
| resin content: | 23 Gew.-% |
| glass fibre Vetrotex ® RO99 P122 1200 Tex internal diameter: | 40 mm |
| external diameter in the waisted zone: | 42 mm |
| length: | 160 mm. |

The formulation has a sufficiently low viscosity and is entirely suitable for the filament winding process. No sedimentation in the impregnating bath or deposition on the filaments is observed.

The specimens are tested for their transverse tensile strength according to A. Puck and W. Schneider in "On Failure Mechanisms and Failure Criteria of Filament Wound Glass-Fibre/Resin Composites" (Plastics & Polymers, February 1969, pp. 33–43). The cure is carried out for 1 h at 150° C.

| | |
|---|---|
| transverse tensile strength: | 67.17 MPa |
| elongation: | 5.299 mm/m |
| modulus: | 14.14 GPa. |

EXAMPLE 9

A mixture of 100 g of the diglycidyl ether-core/shell polymer suspension prepared in Example A and 87 g of a carboxyl-terminated diester prepared from 2 mol of tetrahydrophthalic anhydride and 1 mol of neopentyl glycol has a viscosity (Höppler) of 290 mpa.s at 50° C. and a service life of 9.5 h.

The mouldings obtained from this formulation after a cure of 4 h at 80° C. and 4 h at 140° C. have the following properties:

| | |
|---|---|
| glass transition temperature (DSC): | 151° C. |
| flexural strength (ISO 178): | 120 MPa |
| fracture toughness (bend notch method): | 217 J/m². |

A glass fibre laminate prepared from this formulation with a resin content of 40% has a fracture toughness of 692/J/m² after curing for 4 h at 90° C. and for 8 h at 140° C. The formulation, which can be suitably used for the filament winding process, is used for winding pipes as in Example 8.

| | |
|---|---|
| impregantion bath temperature: | 50° C. |
| mandrel, heated internally to: | 80° C. |
| filament take-off tension: | 4 kp |
| gelation, rotating on mandrel: | 2 h/100 C |
| resin content: | 21–23% by weight | glass fibre Vetrotex ® RO99 P122 1200 Tex.

The following properties of the wound pipes are measured after curing for 2 h at 100° C. and for 8 h at 140° C.

| | |
|---|---|
| transverse tensile strength: | 70.5 MPa |
| elongation: | 5.3 mm/m |
| modulus: | 17.5 GPa.s. |

EXAMPLE 10

Example 4 is repeated using the suspension of a solid diglycidyl ether epoxy resin of Example H. The mouldings obtained under the same curing conditions have a fracture toughness (double torsion test) of 998 J/m².

EXAMPLE 11

110 g of the diglycidyl ether-core/shell polymer suspension prepared in Example C are heated to 50° C. Then 91 g of hexahydrophthalic anhydride and 0.5 g of N-benzyldimethylamine, prepared beforehand in a batch process as mixture, are added, and the entire mixture is thoroughly homogenised at 50° C. before 300 g of the filler are strewed in in portions at 80° C. The mixture is then evacuated under a pressure of 1 mbar for c. 7 min and cast in the appropriate moulds. The cure is carried out for 2 h at 100° C. and for 16 h at 140° C. The mouldings have a fracture toughness (double torsion test) of 677 J/m².

EXAMPLE 12

220 g of the solid diglycidyl ether-core/shell polymer suspension prepared in Example D are charged to a reactor and fused on a hot plate at 100° C. The temperature is raised to 130° C., then 60 g of phthalic anhydride are added in portions and the mixture is homogenised for 3 min. Afterwards the quartz powder is added in portions at 130° C. The entire formulation is then homogenised for 5 min, evacuated under a pressure of 1 mbar and thereafter cast to mouldings and cured for 16 h at 140° C. The mouldings have a fracture toughness (double torsion test) of 1140 J/m².

EXAMPLE 13

115 g of the suspension of a cycloaliphatic epoxy resin according to Example J are charged to a reactor and heated, and 18.6 g of bisphenol A are dissolved therein at 120° C. Then 95 g of a Diels-Alder adduct of methylcyclopentadiene and maleic anhydride and 1 g of 1-methylimidazole are added. The entire formulation is homogenised for c. 5 min at 80° C. and evacuated briefly. The formulation has the following properties:

| | |
|---|---|
| gel time (plate) at 120° C.: | 38 min |
| viscosity (Epprecht) at 80° C.: | 50 mPa.s |

After curing for 1 h at 120° C., for 2 h at 180° C. and for 2 h at 210° C., mouldings with the following properties are obtained:

| | |
|---|---|
| glass transition temperature (TMA): | 218° C. |
| fracture toughness (bend notch method): | 222 J/m$^2$ |
| flexural strength (ISO 178): | 136 MPa |
| impact resistance (ISO 179): | 26 kJ/m$^2$ |

EXAMPLE 14

345 g of the suspension according to Example J are charged to a reactor and heated, and 55.8 g of bisphenol A are dissolved therein at 120° C. Then 285 g of a Diels-Alder adduct of methylcyclopentadiene and maleic anhydride and 3 g of 1-methylimidazole are added. The entire mixture is homogenised, evacuated for 5 min under a high vacuum and used as impregnating solution.

14 layers of glass fibre fabric (Brochier-Injectex 21091) measuring 24.5×24.5 cm are stacked in a heatable closed RTM* laminating mould provided with a high vacuum connection and 2 inlet ports. Under a vacuum of 0.05 mbar and at a mould temperature of 120° C., the mould is filled in about 30 seconds. After a precure for about 2.5 h in the mould, the mould is cooled for a further hour and the product is removed. A flawless light brown homogeneous laminate with a thickness of c. 4 mm is obtained. TEM analysis of the suspension at the inlet and outlet ports of the mould shows that toughener particles are not filtered out during impregnation. The viscosity of the impregnation formulation at the injection temperature is 50 mpa.s.

*RTM=Reaction Transfer Moulding

The laminate has a resin content of 40% and a glass fibre content of 60% and, after curing for 1 h at 120° C., for 2 h at 180° C. and for 2 h at 210° C., has the following properties:

| | |
|---|---|
| glass transition temperature (TMA): | 217° C. |
| farcture toughness (EPFL method)**: | 1076 J/m$^2$ |

**measurement made at the EPFL (Ecole Polytechnique Federal Lausanne) according to P. Davies, W. Cantwell, C. Moulin & H.H. Kausch in Composites Science and Technology 36, 153–166 (1989).

EXAMPLE 15

115 g of the diglycidyl ether-core/shell polymer suspension of Example K, 35 g of methylenebis(3-methyl-4-aminocyclohexane) and 5 g of benzylamine are thoroughly mixed. The mixture has a viscosity (Epprecht) of 100 mPa.s at 80° C. and the gel time of the mixture at 100° C. is 16 min.

After curing for 1 h at 100° C. and for 8 h at 140° C., moulding materials having the following properties are obtained:

| | |
|---|---|
| fracture toughness (bend notch method): | 994 J/m$^2$ |
| flexural strength (ISO 178): | 100 MPa |
| impact resistance (ISO 179): | 64 kJ/m$^2$. |

EXAMPLE 16

Example 15 is repeated without benzylamine. The mixture and the moulding materials prepared therefrom have the following properties:

| | |
|---|---|
| gel ime at 100° C.: | 16 min |
| viscosity (Epprecht) at 80° C.: | 80 mPa.s |
| fracture toughness (bend notch method): | 580 J/m$^2$ |
| flexural strength (ISO 178): | 102 MPa |
| impact resistance (ISO 179): | 40 kJ/m$^2$. |

EXAMPLE 17

The formulation of Example 15 is used as described in Example 14 to make glass fibre laminates by the REM process. Laminates with a resin content of 40% are made from a 4 mm glass fibre fabric and, after curing for 1 h at 100° C. and for 8 h at 140° C., have the following properties:

| | |
|---|---|
| glass transition temperature (TMA): | 128° C. |
| fracture toughness (EPFL method): | 1650 J/m$^2$. |

EXAMPLE 18

Example 17 is repeated, using the mixture of Example 16 to make glass fibre laminates with a resin content of 40%. The laminates have the following properties:

| | |
|---|---|
| glass transition temperature (TMA): | 134° C. |
| fracture toughness (EPFL method): | 1179 J/m$^2$. |

What is claimed is:

1. A curable suspension of an epoxy resin formulation consisting of a) a storage-stable suspension of an epoxy resin and as toughener a core/shell polymer suspended therein in which the toughener is homogeneously dispersed in the form of very fine particles in the submicron range and wherein the core of the core/shell polymer consists of polybutadiene or butadiene/styrene copolymers and the shell contains no groups that react with a curable epoxy resin formulation, wherein said storage-stable suspension is prepared by either 1) when using liquid epoxy resins, adding the aqueous emulsion of a core/shell polymer, with or without a solvent, to the epoxy resin, and removing the water or mixture of water and solvent by vacuum distillation, or 2) when using solid epoxy resins, fusing the solid epoxy resin or dissolving it in a suitable solvent and adding the aqueous emulsion of a core/shell polymer to the epoxy resin, and subsequently removing the water or mixture of water and solvent by vacuum distillation;

b) as a curing agent a compound selected from the group consisting of dicyandiamide, a polycarboxylic acid; a polycarboxylic anhydride; a polyamine selected from the group consisting of ethylenediamine, 1,2-propanediamine, 1,3-propanediamine, N,N-diethylethylenediamine, hexamethylenediamine, diethylenetriamine, triethylentetramine, tetraethylenepentamine, N,N-dimethyl-1,3-propanediamine, N,N-diethyl-1,3-propanediamine, ethanolamine, m- and p-phenylenediamine, bis(4-aminophenyl)methane, aniline-formaldehyde resins, bis(4-aminophenyl)sulfone, m-xylylenediamine, bis(4-aminocyclohexyl)methane, 2,2-bis(4-aminocyclohexyl)propane, 2,2-bis(4-amino-3-methylcyclohexyl)propane, 3-aminomethyl-3,5,5-trimethylcyclohexylamine (isophoronediamine), and N-(2-aminoethyl)piperazine; a polyaminoamide; an amino group-containing adduct of an amine and a polyepoxide; a polyol and a catalytic hardener, and, as optionally, at least one component selected from the group consisting of a curing accelerator, a reinforcing material, and a filler other than the reinforcing material.

2. A suspension according to claim 1, wherein the epoxy resin is a liquid or solid polyglycidyl ether or ester, or a cycloaliphatic epoxy resin.

3. Suspension according to claim 1, wherein the epoxy resin is a liquid or solid diglycidyl ether of a bisphenol, or a diglycidyl ester of a cycloaliphatic or aromatic dicarboxylic acid.

4. A suspension according to claim 1, wherein the curing agent is selected from the group consisting of a polycarboxylic acid, a polycarboxylic anhydride, 3,3'-dimethyl-4,4'-diaminodicyclohexylmethane, dicyandiamide and a catalytic hardener.

5. A suspension according to claim 1, wherein the curing agent is selected from the group consisting of 3,3'-dimethyl-4,4'diaminocyclohexylmethane, dicyandiamide and a catalytic hardener.

6. A curable suspension of an epoxy resin formulation consisting of
   a) a storage-stable suspension of an epoxy resin and as toughener a core/shell polymer suspended therein in which the toughener is homogeneously dispersed in the form of very fine particles in the submicron range and wherein the core of the core/shell polymer consists of polybutadiene or butadiene/styrene copolymers and the shell contains no groups that react with a curable epoxy resin formulation, wherein said storage-stable suspension is prepared by either 1) when using liquid epoxy resins, adding the aqueous emulsion of a core/shell polymer, with or without a solvent, to the epoxy resin, and removing the water or mixture of water and solvent by vacuum distillation, or 2) when using solid epoxy resins, fusing the solid epoxy resin or dissolving it in a suitable solvent and adding the aqueous emulsion of a core/shell polymer to the epoxy resin, and subsequently removing the water or mixture of water and solvent by vacuum distillation;
   b) 3,3'-dimethyl-4,4'-diaminodicyclohexylmethane as a curing agent, and, as optionally, at least one component selected from the group consisting of a curing accelerator, a reinforcing material, and a filler other than the reinforcing material.

7. A casting resin, a laminating resin or an adhesive comprising a suspension as claimed in claim 1 or 4.

* * * * *